M. C. BUFFINGTON.
Wheel Cultivator.
No. 101,706.
Patented April 12, 1870.
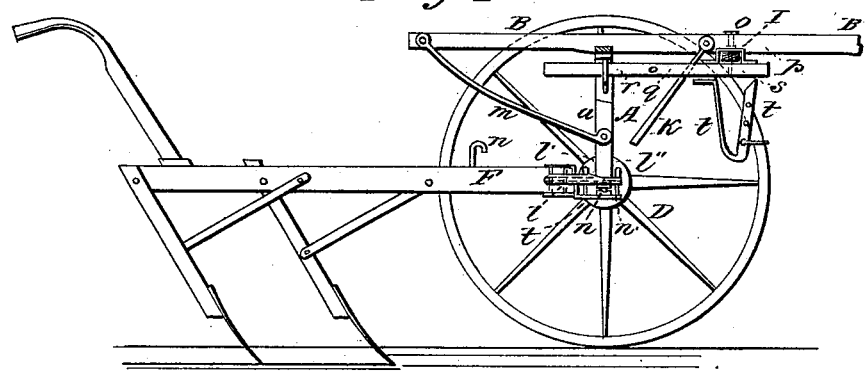
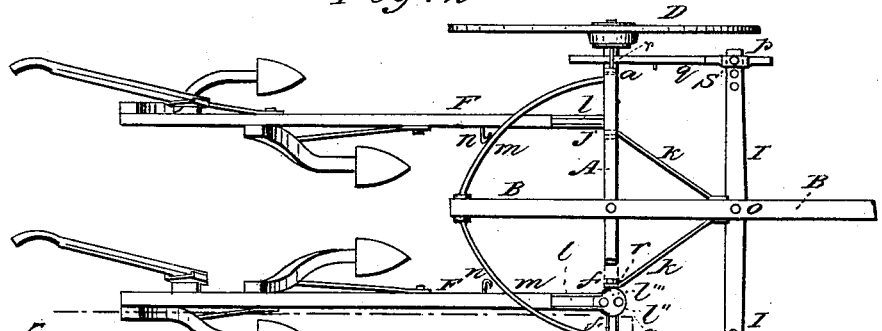
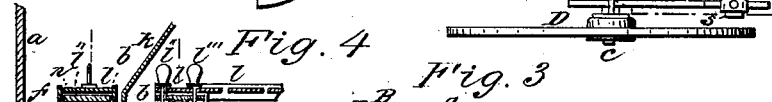
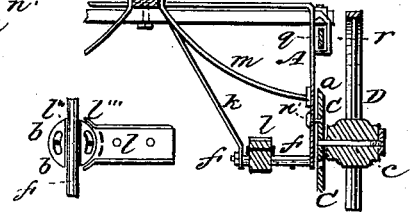
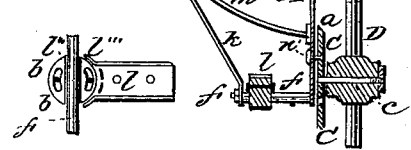
Witnesses
Geo. W. Mabee
Jno. A. Brooks
Inventor
per M. C. Buffington
Munn & Co.
attys

United States Patent Office.

M. C. BUFFINGTON, OF LA HARPE, ILLINOIS.

Letters Patent No. 101,706, dated April 12, 1870.

IMPROVEMENT IN CORN-PLOW.

The Schedule referred to in these Letters Patent and making part of the same

*To all whom it may concern:*

Be it known that I, M. C. BUFFINGTON, of La Harpe, in the county of Hancock and State of Illinois, have invented a new and useful Improvement in Corn-Plows; and I do hereby declare that the following is a full, clear, and exact description thereof, which will enable others skilled in the art to make and use the same, reference being had to the accompanying drawings forming part of this specification, in which—

Figure 1 represents a side elevation, partly in section, of my improved corn-plow.

Figure 2 is a top view or plan of the same.

Figure 3 is a detail vertical transverse section of the same.

Figures 4, 5, and 6 are central sections in three planes, at right angles, vertical across, and longitudinal and horizontal of the universal joint on the end of the plow-beam.

Similar letters of reference indicate corresponding parts.

This invention consists of certain improvements in the construction and arrangement of parts of corn-plows, additional to those patented by me September 24, 1867, No. 69,071, and has for its object to still more simplify the construction of the instrument, and to provide an adjustable draft-attachment. They are made as shown and set forth herein.

The frame of the device is provided with a draft-pole, B, for two horses, and with a set of plows for each side of a row of plants, and with two supporting-wheels, D.

The axle part A is bent and arched up between the wheels for the row of plants, and descends at the sides $a\ a$, to allow of small or moderate-sized wheels.

The wheels D are placed outside of the descending ends $a\ a$ of the axle part, and the plows inside of the same.

The wheels are made adjustable up and down on the ends $a\ a$ of the axle part A by being hung upon wheel-bearing arms C, which have holes both above and below the wheel-spindle $c$, for the attachment by bolts to the axle part A at suitable height.

The plow-beams F are attached by universal-jointed hinges to pivot-arms $f f$, which extend inward from the lower ends of axle A, to give freedom of motion and room for the same inside of the wheels.

The inner ends of the arms $f f$ are braced by bars $k\ k$, extending to the pole B or other parts. These bars may reach backward or upward, but I prefer to make forward braces of them, so as not only to sustain the downward pressure and brace the pole to the other parts, but also to bear the backward strains from the plows.

The employment of bars $m\ m$, that reach from the rear end of the pole B to the outer ends of the axle $a\ a$, near the wheels, is thus permitted.

The invention consists also in a new manner of supporting the plow-beams when they are to be elevated out of the way while the device is transported over the ground.

There are hooks $n\ n$ secured to the plow-beams F near their front ends, so that said hooks can be fitted over the bars $m$, to suspend the beams from the same.

The invention consists also in a new construction of double-tree and draft-attachment, which provides against any undue downward pressure on the necks of the draft animals.

The double-tree I is, by means of a pin, $o$, pivoted to the pole B, in front of the axle, and at its ends it is fitted through eyes formed by straps $p$ on short bars $q\ q$, said bars $q$ being with their rear ends fitted through eyes $r$, formed on the vertical ends of the axle.

The front ends of the bar $q$ are pivoted by pins $s$ to the ends of the double-tree.

From the bars $q$ are suspended bars $t\ t$, which have numbers of apertures to receive the hooks of the whiffletrees.

The whiffletrees can thus be adjusted up and down at will, and they will also swing forward on the pivot of the double-tree if the draft should by some reason become unequal.

The invention finally consists in a new construction of universal hinges for attaching the plow-beams F to the arms $f f$ on the axle parts $a\ a$, which hinges are made of four parts or pieces, $l\ l'$, $n$ and $n'$.

$l$ is a plate, bolted to the end of the plow-beam and extending forward from the same.

$l'$ is another plate, attached to the plate $l$ by bolts $l''$ and $l'''$.

The plate $l'$ is bent toward $l$ at its back end, and rests against it between flanges on $l$, which prevent side movement. This also causes the bolts in front to draw the two plates properly together upon the other parts.

The parts $n\ n'$ form a journal-bearing between the plates $l\ l'$, and clasp the arm $f$, giving vertical range of motion.

The upper half $n$ of the bearing is formed on a circular slotted plate, $b$, which is held against the under side of the plate $l$.

The plate $l'$ receives a small pivot, $d$, from the lower bearing $n'$.

The bearings $n\ n'$ are in an axial line, and form a joint giving lateral motion.

The lateral motion of the plows is limited by the slots cut in the plate part $b$ to accommodate the bolts $l''\ l'''$, which can only move in said slots.

The line of draft of the plows is adjusted by means of the part $n'$, which has at suitable distances one or more duplicates of pivot-points $d$, whereby the point of draft of the plow can be adjusted to either side.

Having thus described my invention,

I claim as new and desire to secure by Letters Patent—

1. The double-tree I, when pivoted at the ends to bars $q$, which slide in straps $v$, and which carry the single-trees on perforated pendants $t$, substantially as and for the purpose herein shown and described.

2. Making and arranging the universal-hinged joints on the ends of the plow-beams, with the several parts and functions as specified and described.

M. C. BUFFINGTON.

Witnesses:
HENRY APPLEBEE,
GEORGE F. OTTO.